Aug. 17, 1965 W. M. WILSON 3,200,842
STOP VALVE AND INCLINED PORT VALVE WITH COMMON OPERATOR
Filed June 20, 1962 2 Sheets-Sheet 2

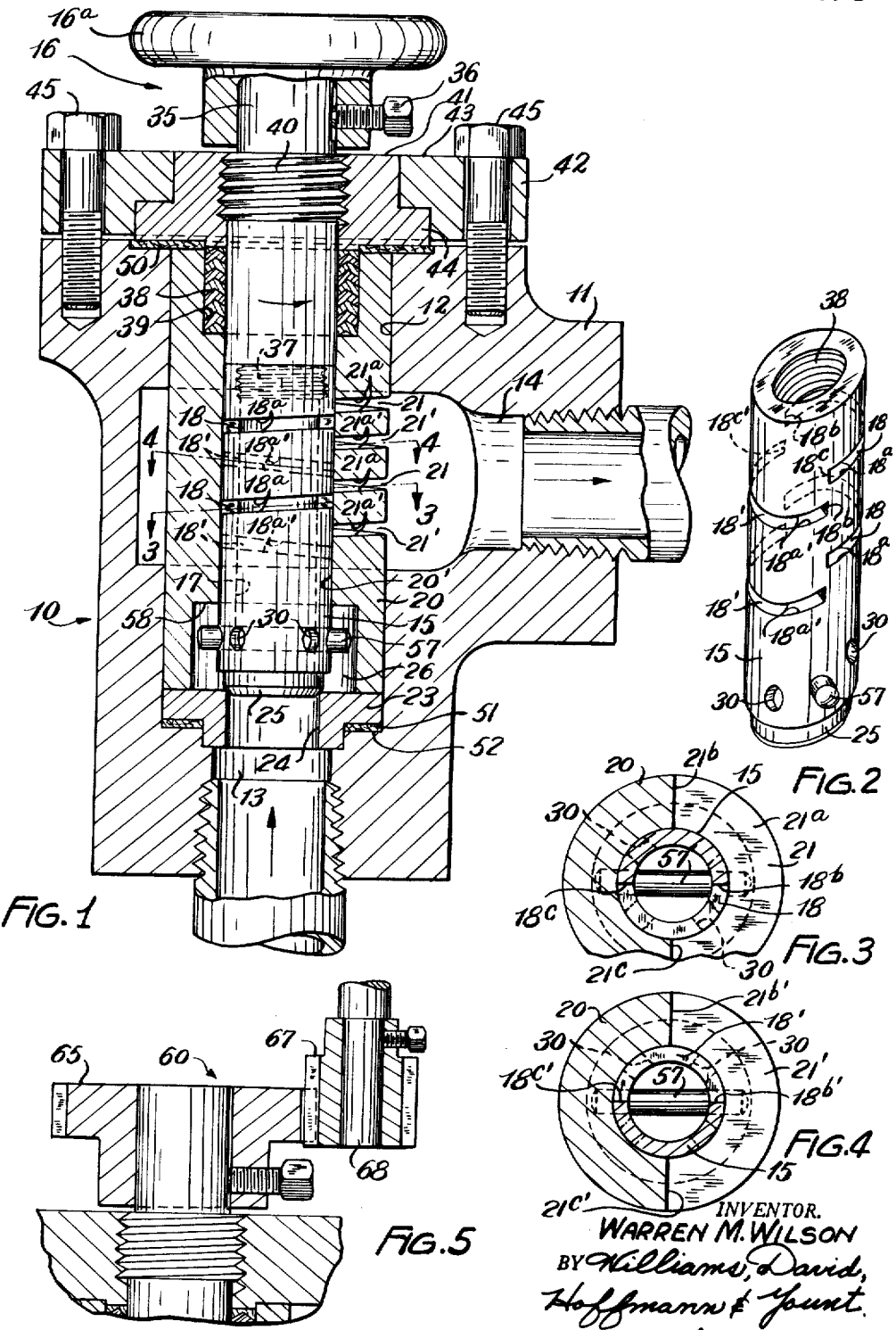

INVENTOR.
WARREN M. WILSON
BY Williams, David,
Hoffmann & Yount
ATTORNEYS

United States Patent Office 3,200,842
Patented Aug. 17, 1965

3,200,842
STOP VALVE AND INCLINED PORT VALVE
WITH COMMON OPERATOR
Warren M. Wilson, 809 Lake St., Huron, Ohio
Filed June 20, 1962, Ser. No. 204,005
10 Claims. (Cl. 137—614.11)

This invention relates to valves for controlling fluid flow and, more particularly, to a novel and improved valve having a precise adjustment providing an infinite number of different flow rates therethrough and a wide variation between the maximum and minimum rates of fluid flow therethrough.

Persons skilled in the art pertaining to control valves are aware of the desirability of a valve providing for precise adjustment of the rate of flow of fluid therethrough and for a high degree of variation between minimum and maximum rates of fluid flow therethrough. However, valves commercially available at the present time do not provide a sufficiently precise adjustment nor a sufficiently high degree of flow variation for certain purposes.

Accordingly, the principal object of the present invention is the provision of a new and improved control valve having a precise adjustment providing a substantially infinite number of different flow rates therethrough.

Another principal object of the present invention is to provide a novel and improved control valve which provides a high degree of variation in the rate of flow therethrough and, more specifically, provides a maximum flow rate which is in the order of several hundred times the minimum flow rate.

Another object of the present invention is to provide a novel and improved control valve, as noted above, which is simple and compact and comprises relatively few parts which are adapted to be easily and rapidly assembled.

A further object of this invention is to provide a novel and improved control valve affording a precise and wide range of flow control and comprising a rotatably and axially shiftable hollow cylindrical valve member having ports inclined with respect to a plane extending perpendicular to the axis thereof for alignment with cooperating inclined ports of a housing member to provide an opening for the passage of fluid therethrough wherein the area of the opening may be increased in extremely small increments providing a substantially infinite number of different flow rates therethrough.

Additionally, this invention provides a novel valve construction, of the character referred to in the preceding paragraph, having threaded means for producing the axial control movement of the valve member while rotary motion of the valve member produces the small increments of movement, and the inclination of the ports in the valve member and housing member are the same as the inclination of the threads of the threaded means to maintain the inclined edges of the ports parallel.

Another object of the present invention is the provision of a novel and improved control valve having a valve member with first and second ports therein which align with third and fourth ports, respectively, in a housing member upon relative movement therebetween to permit fluid to flow therethrough, and the ports are spaced so that the first and third ports partially align when the leading end of the first port passes one end of the second port, to form a first opening therethrough, which opening increases in size until the trailing end of the first port passes the one end of the stationary port, at which time the leading end of the second port passes one end of the fourth port and forms a second opening therethrough, the area of which is greater than the decrease in the area of the first opening due to the movement of the trailing end of the first port past the one end of the third port, thus providing a smooth, even increase in the flow of fluid through the valve.

Another object of the present invention is the provision of a new and improved valve, as noted above, having ports adapted to be aligned to provide flow therethrough and shut-off valve means including valve seat means and a valve closing member movable to engage the valve seat means and tightly shut-off flow of fluid through the valve and wherein the ports in the valve do not align until the valve closing member is moved a predetermined distance from the valve seat which is great enough so that wire drawing between the valve seat and closing member will not occur.

Another object of the present invention is the provision of a new and improved valve having a valve body and relatively movable members with ports adapted to be aligned to provide a flow therethrough and the ports are shaped in a manner to direct the fluid exiting from the valve into the outlet piping without impinging on the valve body thereby minimizing erosion of the valve body by the fluid flowing therethrough.

A still further object of the present invention is the provision of a valve having relative movable valve members which when in alignment provide a flow of fluid through the valve and which are easily moved and self locking, that is, the valve members remain in the position to which they are moved even though extremely high fluid pressure is acting on the valve members tending to cause them to move relative to each other.

Other objects, novel characteristics, and advantages of this invention will be apparent from the following detailed description thereof made with reference to the accompanying drawings forming a part of this specification, in which, FIG. 1 is a vertical axial sectional view through a valve embodying the present invention;

FIG. 2 is a perspective view showing the movable valve member of the valve of FIG. 1 in detached relation;

FIG. 3 is a transverse sectional view taken approximately on section line 3—3 of FIG. 1;

FIG. 4 is a transverse sectional view taken approximately on section line 4—4 of FIG. 1;

FIG. 5 is a fragmentary sectional view of the valve in FIG. 1 showing a modified form of actuating means for imparting movement to the valve member;

Figure 6:
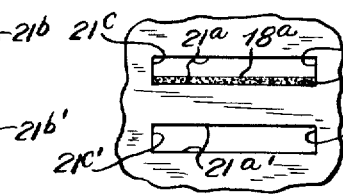
FIGS. 6 to 12 are schematic development views showing the openings provided by alignment of the ports of the movable valve member and the ports of the housing member for various operating positions of the valve member.

The present invention is illustrated, by way of example, as embodied in a valve 10 which will now be described in detail.

The valve 10 includes a housing 11 having a centrally located bore 12 and inlet and outlet openings 13 and 14 communicating with the bore 12. A plug or cylindrical valve member 15 is positioned in the bore 12 and is rotated and axially shiftable therein by drive means 16. The valve member 15 is hollow and has a fluid passageway 17 extending axially therethrough and a plurality of inclined shaped ports, here shown helically inclined, providing a fluid conduit from the passageway 17 to the periphery of the valve member 15. There are four ports in the valve member 15, two of which are designated 18 and two being designated 18'.

A housing valve member or sleeve member 20 having an axial bore 20' is positioned in the bore 12 of the housing 11 and encircles the valve member 15. The sleeve member 20 is provided with a plurality of inclined helical shaped ports equal in number to the ports in valve member 15, and two are designated 21 and two are designated 21'. The ports in the sleeve member 20 provide a fluid conduit from the bore 20' to the periphery thereof and communicate with outlet opening 14. Upon rotation of the valve member 15 portions of the ports therein align with portions of the ports in sleeve member 20, providing an opening for fluid flow therethrough. As the valve member 15 is rotated the area of the opening provided by the aligned ports increases or decreases to vary the rate of flow therethrough, depending upon the direction of rotation, as will be described in detail hereinbelow.

The valve 10 is also provided with shut-off valve means including a seat ring 23 having a fluid passageway 24 therethrough communicating with the inlet opening 13. The end of the passageway 24 opposite the end in communication with the inlet 13 is adapted to be closed by engagement of the seat ring 23 and valve element 25 on the end of the valve member 15 to thereby form a fluid tight seal therebetween. The valve element 25 moves axially relative to the seat ring 23 upon rotation of the valve member 15.

When the valve element 25 is in fluid tight engagement with seat ring 23 and the valve member 15 is rotated in a counterclockwise direction by the drive means 16 the valve element 25 is moved out of engagement with the seat ring 23, permitting fluid to flow through the passageway 24 into the chamber 26 formed in the end of the sleeve member 20 adjacent to the seat ring 23. The valve member 15 is provided with a plurality of ports 30 which communicate with the chamber 26 and with the axially extending passageway 17 and thus permit the fluid to flow into the passageway 17 and the ports 18, 18'. Upon sufficient rotation of the valve member 15 a small area of the ports 18 in valve member 15 align with part of ports 21 in the sleeve member 20 to form a small opening therethrough, the area of which increases smoothly and progressively in small increments as the valve member 15 is rotated counterclockwise to vary the rate of fluid flow through the valve 10 as will be described in detail hereinbelow.

The drive means 16 for rotating the valve member 15 preferably comprises a handwheel 16a suitably secured to the end of a valve stem 35 which projects beyond the housing 11. The valve stem 35 has a first threaded portion 37 extending from the end opposite the end to which the handwheel 16a is secured, and the valve member 15 has an internally threaded opening portion 38 in one end which is adapted to threadedly receive the projecting portion 37 of the valve stem 35 to secure the valve stem 35 and the valve member 15 together. A suitable packing 38 encircles a portion of the stem 35 and maintains a fluid tight engagement therewith. The packing 38 is positioned in a chamber 39 formed in the end of sleeve member 20 adjacent the handwheel 16a.

The valve stem 35 is designed to cause axial movement of the valve member 15 upon rotation thereof and is provided with a second threaded portion 40 intermediate its ends for this purpose. The threaded portion 40 threadedly engages a nut member or bonnet 41 which is secured in position by means of a suitable retaining cover 42 having a projecting portion 43 which extends over a flange portion 44 of the bonnet 41. Suitable bolts 45 are provided for securing the cover 42 to the valve body 11, thereby securing the bonnet 41 to the valve body 11. It should be apparent that upon rotation of the stem 35 in the stationary nut member or bonnet 41 the stem 35 and valve member 15 secured thereto are caused to move axially in a direction dependent upon the direction of rotation of handwheel 16a. The pitch of the threads on the threaded portion 40 and the cooperating threads in bonnet 41 determine the amount of axial movement of the valve member 15 for a given amount of rotation of the valve member.

The bonnet member 41 when clamped in position bears against one end of the sleeve member 20 and a suitable packing 50 is positioned therebetween. The other end of the sleeve member 20 bears against the seat ring 23, which in turn rests on a washer member 51 positioned on a ledge 52 at the inlet end of the valve 10. The valve member 15 is snugly received in the passageway 20' in the sleeve member 20, however, as above described, it is freely rotatable and axially movable therein, and a sufficient lap is provided in the vertical space between the ports in the sleeve member and the valve member to minimize uncontrolled flow.

The ports in the valve member and sleeve member are of the same shape and are illustrated as preferably having a substantially rectangular plan shape. The ports are also inclined to the diameter of the valve member 15 and sleeve member 20, respectively. Preferably, the angle of inclination is such that the height of the inclination of each port is substantially identical to the inclination of the other ports and is equal to the pitch of the threads 40. The bottom and top edges 18a, 18a', 21a, and 21a' of the ports 18, 18', 21, and 21', respectively, lie at all times in parallel planes. The ports 18, 18' are staggered along the axis of the valve member 15 with one port positioned on one side of the axis of the valve member and the next port positioned on the other side of the axis, with the adjacent opposite end edges 18b, 18c, respectively, lying on lines parallel to the axis of the valve member 15. The ports 18, 18' extend approximately 180° around the circumference of the valve member 15 with ports 18 being on one side of the axis of the valve member 15, and ports 18' on the other side thereof.

Figure 15:
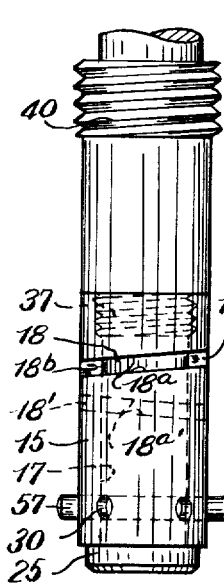
FIG. 15 is a side elevational view showing, in detached relation, another valve member usable in a valve embodying the present invention.
Figure 16:
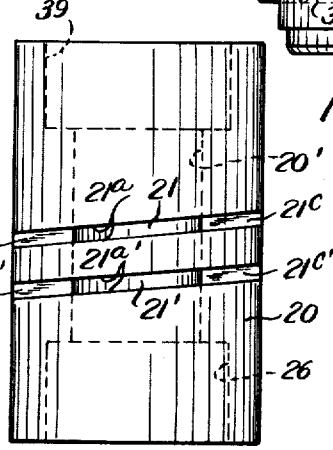
FIG. 16 is a side elevational view showing, in detached relation, another sleeve member usable with the valve member of FIG. 15.

A modified embodiment of the present invention is illustrated in FIGS. 15 and 16 wherein the valve member 15 is provided with two ports designated 18 and 18', rather than four, as in FIG. 1, and sleeve member 20 is also provided with two ports designated 21 and 21'. Any equal even number of ports may be provided in the valve member 15 and sleeve member 20, respectively, as dictated by the design and desired use for the valve.

The ports in the sleeve member 20 are spaced axially and have their opposite end edges 21b, 21c, respectively, lying on lines parallel to the axis of the sleeve member 20. These ports extend for 180° around the sleeve, that is, for one-half the circumference thereof, and are not staggered relative to the axis of the sleeve member, as are ports 18 but rather lie on the same side of a plane extending through the opposite end edges 21b, 21c of the ports. The ports 21, 21' may be designed to direct fluid in any direction but preferably, as shown, these ports open directly toward outlet 14 to prevent the fluid from impinging on the walls of the valve housing 11 and thus the force of the fluid flowing therethrough acting against the valve housing 11 is minimized to minimize erosion of the valve housing.

The ports 18, 18' are positioned and spaced on the valve member 15 so that no portion thereof will align with ports 21, 21' until the valve element 25 is moved a predetermined distance away from seat ring 23. The distance is sufficient to minimize wire drawing caused by fluid flowing into chamber 26. When the valve member 15 is rotated in a direction to stop the flow of fluid through the valve, the ports are closed prior to fluid tight engagement of valve element 25 and seat ring 23, which stops the flow of fluid therethrough.

It should be apparent from the above description that as the valve member 15 is rotated it is simultaneously moved axially relative to the sleeve member 20, causing alignment of portions of the ports 18, 18' and 21, 21', respectively, forming an opening therethrough. The area of the opening increases in minute increments progressively as the valve member 15 is rotated. As a result, the rate of flow of fluid through the valve 10 increases progressively as the area of the opening is increased. This operation can best be visualized from the development views shown in FIGURES 6–12, which illustrate the operation of the valve illustrated in FIGS. 15 and 16 having a two port valve member 15. The operation of the valve having a four port valve member 15 is substantially identical, with the exception, of course, that a greater number of ports are aligned to form the opening through the valve.

Figure 7:
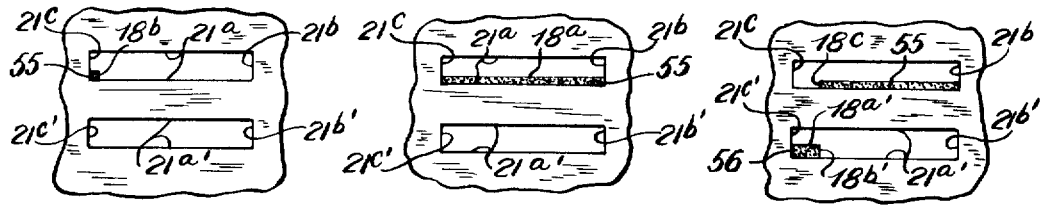

When valve member 15 is rotated, the valve element 25 is moved away from the seat ring 23 a predetermined distance and the leading edge 18b of port 18 partially overlaps and passes edge 21c thereby forming a rectangular opening 55 therethrough, as illustrated in FIG. 6. The top edge of the opening is formed by the top edge 18a of port 18 and the bottom edge of the opening is formed by the bottom edge 21a of port 21. Continued rotation of the valve member 15 will progressively increase the area of the opening, as shown in FIG. 7. The area of the opening increases in equal increments for each degree of rotation of the valve member 15, and the area of the opening takes the shape of a rectangle because of the above described parallel edges of the slots 18 and 21.

Figure 8:
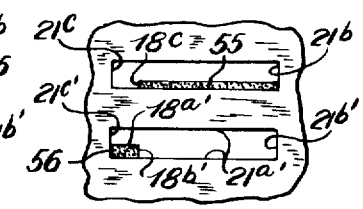

The width of the opening designated w in FIG. 6, formed by ports 18 and 21 increases until the vertical end walls 18b of port 18 and 21b of port 21 are aligned, as illustrated in FIG. 7. Rotation beyond this point causes the trailing end 18c of port 18 to pass beyond end 21c of port 21 effecting a decrease in the width w of the opening formed by ports 18 and 21, as shown in FIG. 8. However, at this same time the leading edge 18 of port 18' passes the first end 21c' of port 21' to partially align port 18' with port 21' and form an opening 56 with the width w of the opening 56 formed by port 18' and port 21' being equal to the decrease in width of the opening formed by port 18 and port 21. However, the height h' of the opening 56 formed by port 18' and port 21' is greater than the height h of the opening formed by port 18 and port 21. This results in a smooth, even increase in the area through which fluid flows, thus smoothly and evenly increasing the rate of flow through the valve since the rate depends upon the combined area of the openings through these ports.

Figure 9:
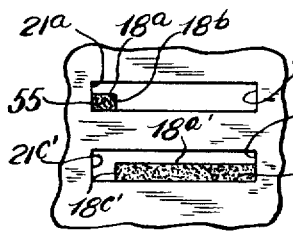

Further rotation of valve member 15 with respect to sleeve member 20 decreases the size of the opening 55 formed by port 18 and port 21 until the opening 55 is eliminated and the opening 56 formed by port 18' and port 21' extends the complete width of the port 21'. Continued rotation of valve member 15 causes a decrease in the area of the opening 56 formed by ports 18', 21', but a partial realignment of port 18 and port 21 takes place, as shown in FIG. 9, causing the opening 55 to be again formed. Since the height h of the opening 55 created by this realignment is greater than the height of the opening 56 formed by port 18' and port 21', while the width a of the opening 55 corresponds to the loss in width of the opening 56, an increase in the combined cross-sectional area of the openings is achieved with a corresponding increase in the rate of flow through the valve.

Figure 10:
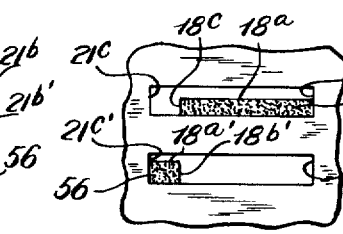
Figure 11:
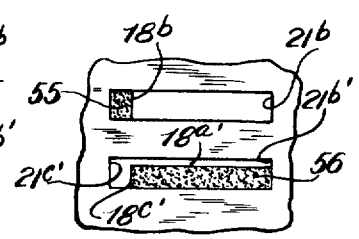
Figure 12:
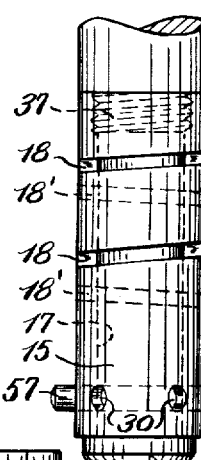
Figures 13, 14:
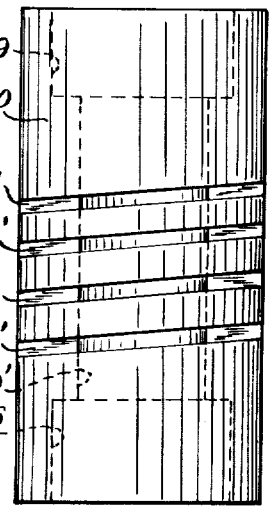
FIG. 13 is a side elevational view showing the valve member of the valve of FIG. 1 in a detached relation.
FIG. 14 is a side elevational view showing the cylindrical sleeve member of the valve of FIG. 1 in a detached relation.

Rotation of valve member 15 an additional amount will change the area of the opening as shown in FIG. 10 with a still further increase in the flow rate. The openings shown in FIG. 10 are similar to those shown in FIG. 8 with each being correspondingly larger. In the same way, further rotation will create openings as shown in FIG. 11 which are similar to the openings shown in FIG. 9 but of a larger size. The opening formed by port 18 and port 21 in FIG. 11 has a height equal to the height of the port 21 so that further rotation of valve member 15 will completely align port 18 and port 21 as shown in FIG. 12 and achieve maximum flow through the valve.

The valve illustrated in FIG. 1 having four ports operates in substantially the same manner as the two port valve, however, the maximum flow through the valve is considerably greater because maximum flow is obtained upon complete alignment of two ports in the valve member 15 with two ports in the sleeve member 20. The maximum flow rate through the valve may be changed by increasing the number of ports in the sleeve member 20 and valve member 15. Many different port arrangements are possible, as should be apparent, and ports could be used which extend 90° rather than the illustrated 180°.

Further rotation of the valve member 15 in a counterclockwise direction after the ports are completely aligned is prevented by stop pin 57 which extends through openings in the end of valve member 15 located in chamber 26. The stop pin 57, when the ports 18 and 21 are completely aligned, as shown in FIG. 12, engages the ledge 58 formed on sleeve member 20 and can move vertically no further. The stop pin 57 also functions as a safety device for preventing rotation of the valve member 15 to an extent great enough to cause the threads 40 to become disengaged from the nut 41.

From the above description it should now be recognized that the valve of the present invention provides a simple and convenient structure for achieving precise adjustment of flow rates over a wide range. The area of opening for the flow of fluid through the valve may be varied from the very small opening shown in FIG. 6 formed by the partial alignment of port 18 and port 21 to the full opening shown in FIG. 12 created by the full alignment of port 18 and port 21. The ratio between the minimum opening and the maximum opening and the degree of adjustment of the flow rate for a particular valve will depend primarily upon the size of the ports as well as upon the pitch of the threads 40 and the pitch or inclination of the ports. The pitch of threads 40 is dictated not only by the desired sensitivity of the valve but also by the pressure of the fluid being handled. The pitch should be chosen so that the pressure of the fluid cannot cause rotation of the valve member 15 and so that the valve member 15 will remain in the position to which it is rotated.

It should also be apparent that while the valve illustrated in FIG. 1 is manually opened and adjusted, many different automatic drive mechanisms may be utilized to rotate valve member 15 to automatically adjust the valve to pass fluid therethrough at the desired rate. FIG. 5 shows a suitable drive mechanism 60 for rotating the valve member 15 including a gear 65 suitably secured to the valve stem 35 and driven by a pinion 67 suitably secured to a shaft 68. The shaft 68 is in turn driven by a suitable reversible power source (not shown) which may be a reversible electric motor. The power source may be actuated by suitable manual or automatic remote controls to automatically control the rate of flow through the valve 10. The disclosed valve 10 is illustrated and described as opening upon counterclockwise movement of valve member 15, however, opening may occur upon clockwise movement by making necessary design changes, mainly changing the pitch of threads 40.

From the accompanying drawings and the foregoing detailed description, it should be apparent that this invention provides a novel and improved valve structure which permits precise adjustment of rates of flow therethrough over a wide range where the maximum flow rate is several hundred times the minimum flow rate, and that the control valve is simple in construction, compact, and may be easily and conveniently assembled. Furthermore, the novel and improved control valve of this invention may be manufactured at low cost employing conventional manufacturing operations and has the additional advanage that the working parts may be replaced simply and conveniently as they become worn.

Although the valve structure of this invention has been illustrated and described herein to a somewhat detailed extent, it will be understood, of course, that this invention is not to be regarded as being limited correspondingly in scope but includes all changes and modifications coming within the terms of the claims hereof.

Having described my invention, I claim:

1. A valve comprising a valve body, a first valve member carried by said valve body, a second valve member carried by said valve body and rotatable relative to said first valve member, means for rotating said second valve member relative to said first valve member, means providing a first port in said first valve member and a second port in said second valve member the leading edge of which when the second valve member is rotated partially overlaps and passes one edge of said first port to form a progressively increasing area of opening through said first and second ports until said first and second ports are aligned and a decreasing area of opening through said first and second ports when the trailing edge of said second port passes beyond said one edge of said first port, and means providing a third port in said first valve member and a fourth port in said second valve member the leading edge of which passes and partially overlaps one edge of said third port when said trailing edge of said second port passes beyond said one edge of said first port to provide an opening of increasing area through said third and fourth ports while the opening through said first and second ports is decreasing in area, said increase in area of the opening through said third and fourth ports for a given increment of movement of said second member being greater than said decrease in area of the opening through said first and second ports resulting in an overall increase in the area of the opening for fluid flow through the valve, inlet passage means in said valve body communicating with the ports in one of said valve members, and outlet passage means in said body communicating with the ports in the other of said valve members.

2. A valve as defined in claim 1 wherein said ports are shaped to direct the flow of fluid into said outlet thereby minimizing impingement of the fluid on the valve body and erosion of the valve body resulting therefrom.

3. A valve comprising a valve body, a first valve member carried by the valve body, a second valve member carried by said valve body and movable relative to said first valve member, means for moving said second valve member relative to said first valve member, means providing a first port in said first valve member and a second port in said second valve member the leading edge of which when moved partially overlaps and passes one edge of said first port to form a progressively increasing area of opening through said first and second ports until said first and second ports are aligned and a decreasing area of opening through said first and second ports when the trailing edge of said second port passes beyond said one edge of said first port, and means providing a third port in said first valve member and a fourth port in said second valve member the leading edge of which passes and partially overlaps one edge of said third port when said trailing edge of said second port passes beyond said one edge of said first port to provide an opening of increasing area through said third and fourth ports, said increase in area for a given increment of movement of said first member being greater than said decrease in area resulting in an overall increase in the area of the opening for fluid flow through the valve, inlet passage means in said valve body communicating with said second and fourth ports, said first and third ports communicating with an outlet passage in said valve body, valve means located in said inlet passage means, and means for opening said valve means a predetermined amount prior to partial overlap of the leading edge of said second port in said second valve member with said one edge of said first port in said first valve member.

4. A valve as defined in claim 3 wherein said second valve member comprises a cylindrical plug member, and said first valve member comprises a sleeve member encircling said plug member and said valve means comprises a valve element supported by said plug member and a seat ring adapted to be engaged by said valve element.

5. A valve comprising a valve body, a sleeve member carried by said valve body, a cylindrical valve member carried by said valve body and positioned within said sleeve member and rotatable relative thereto, means for moving said valve member axially relative to said sleeve member upon rotation thereof relative thereto, means providing a first port in said sleeve member and a second port in said valve member the leading edge of which overlaps and passes one edge of said first port to form a progressively increasing area of opening to said first and second ports until said first and second ports are aligned and a decreasing area of opening to said first and second ports when the trailing edge of said second port passes beyond said one edge of said first port, and means providing a third port in said sleeve member and a fourth port in said valve member the leading edge of which passes and overlaps one edge of said third port when said trailing edge of said second port passes beyond said one edge of said first port to provide an opening of increasing area through said third and fourth ports, said increase in area for a given increment of movement of said valve member being greater than said decrease in area resulting in an overall increase in the area of the opening for fluid flow through the valve, inlet passage means in said valve body for connecting said second and fourth ports to a fluid supply, said first and third ports being connected to an outlet passage in said valve body, a valve element supported by said valve member, and a seat ring located in said inlet passage and adapted to be engaged by said valve element to block the flow of fluid through said inlet passage and means connecting said valve element to said means for moving said valve member axially to open said valve element prior to overlapping of said one edge of said first port with the leading edge of said second port.

6. A valve comprising a valve body, a first valve member carried by said valve body, a second valve member carried by said valve body and rotatable relative to said first valve member, means for rotating said second valve member relative to said first valve member, means providing a first port in said first valve member and a second port in said second valve member the leading edge of which when the second valve member is rotated partially overlaps and passes one edge of said first port to form a progressively increasing area of opening through said first and second ports until said first and second ports are aligned and a decreasing area of opening through said first and second ports when the trailing edge of said second port passes beyond said one edge of said first port, means providing a third port in said first valve member and a fourth port in said second valve member the leading edge of which passes and partially overlaps one edge of said third port when said trailing edge of said second port passes beyond said one edge of said first port to provide an opening of increasing area through said third and fourth ports while the opening through said first and second ports is decreasing in area, said increase in area of the opening through said third and fourth ports for a given increment of movement of said second member being greater than said decrease in area of the opening through said first and second ports resulting in an overall increase in the area of the opening for fluid flow through the valve, inlet passage means in said valve body communicating with the ports in one of said valve members, and outlet passage means in said valve body communicating with the ports in the other of said valve members, and said ports being inclined with respect to a plane extending perpendicular to the axis of rotation of said second member.

7. A valve comprising a valve body, a first valve member carried by said valve body, a second valve member carried by said valve body and rotatable relative to said first valve member, means for rotating said second valve member relative to said first valve member, means providing a first port in said first valve member and a second port in said second valve member the leading edge of which when the second valve member is rotated partially overlaps and passes one edge of said first port to form a progressively increasing area of opening through said first and second ports until said first and second ports are aligned and a decreasing area of opening through said first and second ports when the trailing edge of said second port passes beyond said one edge of said first port, means providing a third port in said first valve member and a fourth port in said second valve member the leading edge of which passes and partially overlaps one edge of said third port when said trailing edge of said second port passes beyond said one edge of said first port to provide an opening of increasing area through said third and fourth ports while the opening through said first and second ports is decreasing in area, said increase in area of the opening through said third and fourth ports for a given increment of movement of said second member being greater than said decrease in area of the opening through said first and second ports resulting in an overall increase in the area of the opening for fluid flow through the valve, inlet passage means in said valve body communicating with the ports in one of said valve members, outlet passage means in said valve body communicating with the ports in the other of said valve members, and said second valve member comprising a cylindrical plug member and said first valve member comprising a sleeve member encircling said plug member.

8. A valve as defined in claim 7 wherein said means for moving said plug member includes a threaded stem portion secured to said plug member and a cooperating nut member within which said stem portion rotates to rotate said cylindrical plug member and simultaneously move it axially.

9. A valve as defined in claim 8 wherein said ports are inclined with respect to a plane extending perpendicular to the axis of rotation of said members at an inclination equal to the pitch of the threads on said threaded stem portion.

10. A valve comprising a hollow housing member having a port therein providing a fluid passage from the interior thereof to the periphery thereof, a hollow valve member having a port therein providing a fluid passage from the interior thereof to the periphery thereof and positioned in the passageway in said housing member and rotatable and axially movable therein, inlet passage means connecting said port in said valve member to a supply of fluid, valve element means in said inlet passage supported by said valve member, a seat for said valve element, engagement of said valve element and said seat blocking the flow of fluid through said inlet passage, and means for rotating said valve member and moving it axially relative to said housing member to move said valve element out of engagement with said seat and to subsequently align said ports to provide an opening for the flow of fluid therethrough, and said means for rotating said valve member including a threaded stem portion secured to said valve member and a cooperating nut member within which said stem portion rotates to move said valve member axially simultaneously with rotation thereof, said ports being inclined with respect to a plane extending perpendicular to the axis of rotation of said plug member at an inclination equal to the pitch of the threads on said threaded stem portion.

References Cited by the Examiner
UNITED STATES PATENTS

| | | | |
|---|---|---|---|
| 891,672 | 6/08 | Crane | 251—284 XR |
| 2,095,127 | 10/37 | Curtin | 251—126 |
| 2,106,572 | 1/38 | Meagher | 251—325 XR |
| 2,158,737 | 5/39 | Wunsch | 251—325 XR |
| 2,394,345 | 2/46 | Werner | 251—266 XR |
| 2,958,501 | 11/60 | Pickett | 251—205 XR |
| 3,098,508 | 7/63 | Gerdes | 137—637.4 |

FOREIGN PATENTS

| | | |
|---|---|---|
| 344,557 | 11/21 | Germany. |
| 270,742 | 9/27 | Great Britain. |

MARTIN P. SCHWADRON, *Acting Primary Examiner.*
WILLIAM F. O'DEA, *Examiner.*